US012597603B2

(12) United States Patent
Aoki et al.

(10) Patent No.: US 12,597,603 B2
(45) Date of Patent: Apr. 7, 2026

(54) CATHODE ACTIVE MATERIAL FOR NON-AQUEOUS-ELECTROLYTE SECONDARY BATTERY AND NON-AQUEOUS-ELECTROLYTE SECONDARY BATTERY

(71) Applicants: Panasonic Corporation, Kadoma (JP); SANYO Electric Co., Ltd., Daito (JP)

(72) Inventors: Yoshinori Aoki, Osaka (JP); Shun Nomura, Osaka (JP); Takeshi Ogasawara, Osaka (JP)

(73) Assignees: PANASONIC HOLDINGS CORPORATION, Osaka (JP); PANASONIC ENERGY CO., LTD., Osaka (JP)

( * ) Notice: Subject to any disclaimer, the term of this patent is extended or adjusted under 35 U.S.C. 154(b) by 813 days.

(21) Appl. No.: 17/621,874

(22) PCT Filed: Jun. 23, 2020

(86) PCT No.: PCT/JP2020/024534
§ 371 (c)(1),
(2) Date: Dec. 22, 2021

(87) PCT Pub. No.: WO2020/262348
PCT Pub. Date: Dec. 30, 2020

(65) Prior Publication Data
US 2022/0255074 A1    Aug. 11, 2022

(30) Foreign Application Priority Data
Jun. 27, 2019    (JP) ................................ 2019-119298

(51) Int. Cl.
*H01M 4/525* (2010.01)
*H01M 4/36* (2006.01)
(Continued)

(52) U.S. Cl.
CPC ........... *H01M 4/525* (2013.01); *H01M 4/366* (2013.01); *H01M 4/505* (2013.01); *H01M 10/0525* (2013.01); *H01M 2004/028* (2013.01)

(58) Field of Classification Search
CPC ...... H01M 4/525; H01M 4/366; H01M 4/505; H01M 10/0525; H01M 2004/028
See application file for complete search history.

(56) References Cited

U.S. PATENT DOCUMENTS

| | | | |
|---|---|---|---|
| 2006/0083988 A1 | 4/2006 | Deguchi et al. | |
| 2009/0169999 A1 | 7/2009 | Deguchi et al. | |
| 2019/0036119 A1* | 1/2019 | Lee ....................... | H01M 4/131 |

FOREIGN PATENT DOCUMENTS

| | | |
|---|---|---|
| JP | 2007-335405 A | 12/2007 |
| JP | 2009-129820 A | 6/2009 |

(Continued)

OTHER PUBLICATIONS

Machine translation of KR20180004672 (Year: 2024).*
International Search Report dated Sep. 8, 2020, issued in counterpart application No. PCT/JP2020/024534 (2 pages).

*Primary Examiner* — Milton I Cano
*Assistant Examiner* — Albert Michael Hilton
(74) *Attorney, Agent, or Firm* — WHDA, LLP

(57) ABSTRACT

Provided is a cathode active material for a non-aqueous-electrolyte secondary battery, the cathode active material containing a lithium composite oxide that has a layered structure containing a Li layer and that is represented by general formula $LiaNi\alpha Al\beta Co\gamma M\delta SrxO_{2-w}$ (in the formula, $0.95<a<1.05$, $0.85\leq\alpha\leq0.95$, $0<\beta\leq0.08$, $0\leq\gamma\leq0.1$, $0\leq\delta\leq0.15$, $0<x\leq0.015$, $0\leq w<0.05$, $\alpha+\beta+\gamma+\delta=1$, and M is at least one type of element selected from Mn, Fe, Ti, Si, Nb, Zr, Mo, and Zn), wherein the proportions of metal elements present in the Li layer excluding Li are in the range of 1-2.5 mol %
(Continued)

with respect to the total molar quantity of metal elements in
the lithium composite oxide excluding Li.

6 Claims, 1 Drawing Sheet

(51) Int. Cl.
   _H01M 4/505_         (2010.01)
   _H01M 10/0525_    (2010.01)
   _H01M 4/02_           (2006.01)

(56)                References Cited

FOREIGN PATENT DOCUMENTS

| JP | 5245210 B2 | | 7/2013 |
| KR | 20180004672 | * | 1/2018 |
| WO | 2005/099022 A1 | | 10/2005 |

* cited by examiner

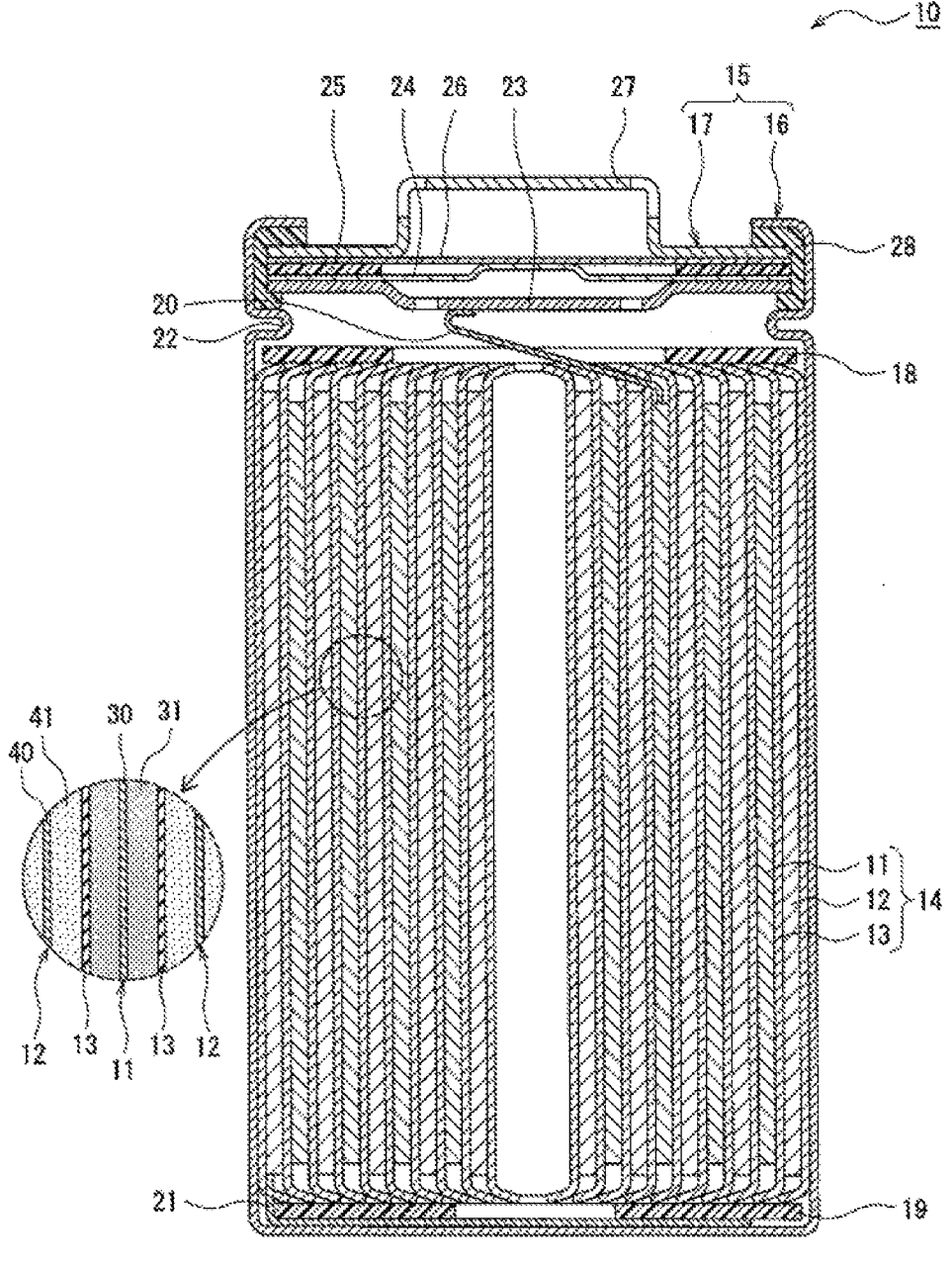

CATHODE ACTIVE MATERIAL FOR NON-AQUEOUS-ELECTROLYTE SECONDARY BATTERY AND NON-AQUEOUS-ELECTROLYTE SECONDARY BATTERY

TECHNICAL FIELD

The present disclosure relates to a positive electrode active material for non-aqueous electrolyte secondary batteries and a non-aqueous electrolyte secondary battery.

BACKGROUND ART

In recent years, non-aqueous electrolyte secondary batteries, which comprise a positive electrode, a negative electrode, and a non-aqueous electrolyte and are charged and discharged by moving lithium ions, etc., between the positive electrode and the negative electrode, have been widely used as secondary batteries having a high output and a high energy density. From the viewpoint of lowering the resistance and increasing the capacity of the batteries, they are required for improving characteristics of the positive electrode active materials included in the positive electrodes of the batteries.

For example, Patent Literature 1 describes a positive electrode active material having improved charge/discharge cycle characteristics while addressing higher capacity, which is a lithium composite oxide having a layered structure and including Mn, Ni, Co, Sr, and Mo, wherein a Mo content is 0.1 mol % to 1.5 mol % and a content ratio of Mo to Sr (Mo/Sr) is 0.5 to 2.0 by molar ratio.

CITATION LIST

Patent Literature

PATENT LITERATURE 1: Japanese Patent No. 5245210

SUMMARY

By the way, the lithium composite oxide included in the positive electrode active material is considered to be designed to decrease a Co content in order to reduce the production cost while increasing a Ni content in order to obtain a high discharge capacity. However, in the case of the proportion of Ni to the total number of mole of the metal elements excluding Li is 85 mol % or more and the proportion of Co is 10 mol % or less, the layered structure of the lithium composite oxide may become unstable, thus increasing the reaction resistance of the battery. The technique of Patent Literature 1 does not consider the reaction resistance, and still has room for improvement.

Therefore, an object of the present disclosure is to provide a positive electrode active material including a lithium composite oxide that reduces a reaction resistance of a battery, wherein a proportion of Ni to the total number of mole of metal elements excluding Li is 85 mol % or more and a proportion of Co is 10 mol % or less.

The positive electrode active material for non-aqueous electrolyte secondary batteries that is one aspect of the present disclosure is characterized in that it includes a lithium composite oxide having a layered structure and represented by the formula $Li_aNi_\alpha Al_\beta Co_\gamma M_\delta Sr_x O_{2-w}$, wherein in the formula, $0.95 < a < 1.05$, $0.85 \leq \alpha \leq 0.95$, $0 < \beta \leq 0.08$, $0 \leq \gamma \leq 0.1$, $0 \leq \delta \leq 0.15$, $0 < x \leq 0.015$, $0 \leq w < 0.05$, $\alpha + \beta + \gamma + \delta = 1$, and M is at least one element selected from the group consisting of Mn, Fe, Ti, Si, Nb, Zr, Mo, and Zn, and the layered structure includes a Li layer including metal elements other than Li, and a proportion of the metal elements other than Li present in the Li layer is in a range of 1 mol % or more and 2.5 mol % or less based on the total molar amount of the metal elements excluding Li in the lithium composite oxide.

The non-aqueous electrolyte secondary battery that is one aspect of the present disclosure is characterized by comprising a positive electrode including the aforementioned positive electrode active material, a negative electrode, and a non-aqueous electrolyte.

According to the positive electrode active material for non-aqueous electrolyte secondary batteries that is one aspect of the present disclosure, a non-aqueous electrolyte secondary battery having a low reaction resistance can be provided.

BRIEF DESCRIPTION OF DRAWING

FIG. 1 is a cross sectional plan view of the non-aqueous electrolyte secondary battery according to an example of an embodiment.

DESCRIPTION OF EMBODIMENTS

The layered structure of the lithium composite oxide has a transition metal layer such as Ni, a Li layer, and an oxygen layer, and the Li ions present in the Li layer reversibly move in and out, so that a charge/discharge reaction of the battery proceeds. Here, when the lithium composite oxide included in the positive electrode active material has a proportion of Ni to the total number of mole of metal elements excluding Li being 85 mol % or more and a proportion of Co being 10 mol % or less, the layered structure becomes unstable because many Li ions are extracted from the Li layer upon charge of the battery, and the reaction resistance of the battery may be increased. However, as in the positive electrode active material for non-aqueous electrolyte secondary batteries that is one embodiment of the present disclosure, including Al and Sr in predetermined amounts and further including the metal element other than Li in a predetermined amount in the Li layer can reduce the reaction resistance due to generation of a synergistic effect of the addition of Al and the addition of Sr. Since Al does not change in oxidation number even during charge/discharge, the structure of the transition metal layer is presumed to be stabilized by Al being included in the transition metal layer. Sr is presumed to be present as a compound in the layered structure or on the surface of the lithium composite oxide, and it is presumed that the resistance can be lowered because the electric interaction changes the surface state of the lithium composite oxide. Moreover, it is presumed that the presence of the metal element in the Li layer in a predetermined amount contemplates to stabilize the layered structure by retaining the Li layer by the metal element present in the Li layer in the predetermined amount, even if a large amount of Li ions are extracted from the Li layer upon charge of the battery, which inhibits reduction of charge/discharge characteristics. In the lithium composite oxide of the present disclosure, the metal element present in the Li layer of the layered structure is mainly Ni, however, a metal element other than Ni included in the lithium composite oxide may also be present in the Li layer.

An example of the embodiment of the non-aqueous electrolyte secondary battery according to the present disclosure will be described in detail below. In the following, a cylindrical battery in which a wound electrode assembly is housed in a cylindrical battery case is illustrated, however, the electrode assembly is not limited to the wound type, and a plurality of positive electrodes and a plurality of negative electrodes may be alternately stacked one by one with separators interposed therebetween. Further, the battery case is not limited to a cylindrical shape, and may be, for example, a square shape, or a coin shape, or may be a battery case formed of a laminated sheet including a metal layer and a resin layer.

FIG. 1 is a cross sectional plan view of a non-aqueous electrolyte secondary battery 10 that is an example of the embodiment. As illustrated in FIG. 1, non-aqueous electrolyte secondary battery 10 comprises an electrode assembly 14, a non-aqueous electrolyte (not shown), and a battery case 15 that houses electrode assembly 14 and the non-aqueous electrolyte. Electrode assembly 14 has a wound structure in which a positive electrode 11 and a negative electrode 12 are wound via a separator 13. Battery case 15 is composed of a bottomed cylindrical outer can 16 and a sealing assembly 17 that clogs up the opening of an outer can 16.

Electrode assembly 14 is composed of long positive electrode 11, long negative electrode 12, two long separators 13, a positive electrode tab 20 joined to positive electrode 11, and a negative electrode tab 21 joined to negative electrode 12. Negative electrode 12 is formed to have a size one size larger than that of positive electrode 11 in order to prevent lithium from precipitation. Namely, negative electrode 12 is formed longer than positive electrode 11 in the longitudinal direction and the width direction (short direction). Two separators 13 are formed to have sizes at least one size larger than a size of positive electrode 11, and are arranged to sandwich positive electrode 11, for example.

Non-aqueous electrolyte secondary battery 10 comprises insulating plates 18 and 19 arranged above and below electrode assembly 14, respectively. In the example shown in FIG. 1, positive electrode tab 20 attached to positive electrode 11 extends to the sealing assembly 17 side through the throughhole of insulating plate 18, and negative electrode tab 21 attached to negative electrode 12 passes through the outside of insulating plate 19 and extends to the bottom side of outer can 16. Positive electrode tab 20 is connected to the lower surface of a bottom plate 23 of sealing assembly 17 by welding or the like, and a cap 27 of sealing assembly 17 electrically connected to bottom plate 23 serves as a positive electrode terminal. Negative electrode tab 21 is connected to the inner surface of the bottom of outer can 16 by welding or the like, and outer can 16 serves as a negative electrode terminal.

Outer can 16 is, for example, a bottomed cylindrical metal container. A gasket 28 is arranged between outer can 16 and sealing assembly 17, and seals the internal space of battery case 15. Outer can 16 has a groove portion 22 that supports sealing assembly 17, which is formed by pressing, for example, the side surface portion from the outside. Groove portion 22 is preferably formed in an annular shape along the circumferential direction of outer can 16, and supports sealing assembly 17 on the upper surface of the groove portion.

Sealing assembly 17 has a structure in which bottom plate 23, a lower vent member 24, an insulating member 25, an upper vent member 26, and cap 27 are stacked in this order from the electrode assembly 14 side. Each member constituting sealing assembly 17 has, for example, a disk shape or a ring shape, and each member except insulating member 25 is electrically connected to each other. Lower vent member 24 and upper vent member 26 are connected to each other at the central portion thereof, and insulating member 25 is interposed between the peripheral portions of each member. When the internal pressure of the battery rises due to abnormal heat generation, lower vent member 24 is deformed and broken so as to push upper vent member 26 toward the cap 27 side, and the current path between lower vent member 24 and upper vent member 26 is cut off. When the internal pressure further rises, upper vent member 26 is broken and a gas is discharged from the opening of cap 27.

Hereinafter, positive electrode 11, negative electrode 12, separator 13, and the non-aqueous electrolyte, constituting non-aqueous electrolyte secondary battery 10, will be described in detail, and in particular, the positive electrode active material included in a positive electrode active material layer 31 forming positive electrode 11 will be described in detail.

[Positive Electrode]

Positive electrode 11 has a positive electrode current collector 30 and a positive electrode active material layer 31 formed on both sides of positive electrode current collector 30. As positive electrode current collector 30, a foil of a metal such as aluminum or an aluminum alloy that is stable in the potential range of positive electrode 11, or a film or the like in which the metal is arranged on the surface layer, can be used. Positive electrode active material layer 31 includes a positive electrode active material, a conductive agent, and a binder. The thickness of positive electrode active material layer 31 is, for example, 10 μm to 150 μm on one side of positive electrode current collector 30. Positive electrode 11 is fabricated by coating a surface of positive electrode current collector 30 with a positive electrode slurry including the positive electrode active material, the conductive agent, the binder, etc., drying the coating film, and then compressing it to form positive electrode active material layers 31 on both sides of the positive electrode current collector 30.

The conductive agent included in positive electrode active material layer 31 that is carbon materials such as carbon black, acetylene black, Ketjen black, and graphite, can be exemplified. As the binder included in positive electrode active material layer 31, fluororesins such as polytetrafluoroethylene (PTFE) and polyvinylidene difluoride (PVdF), polyacrylonitrile (PAN), polyimides, acrylic resins, and polyolefins can be exemplified. These resins may be combined with carboxymethyl cellulose (CMC) or a salt thereof, polyethylene oxide (PEO), or the like.

The positive electrode active material includes a lithium composite oxide having a layered structure and represented by a formula $Li_aNi_\alpha Al_\beta Co_\gamma M_\delta Sr_x O_{2-w}$ wherein in the formula, $0.95 < a < 1.05$, $0.85 \leq \alpha \leq 0.95$, $0 < \beta \leq 0.08$, $0 \leq \gamma \leq 0.1$, $0 \leq \delta \leq 0.15$, $0 < x \leq 0.015$, $0 \leq w < 0.05$, $\alpha + \beta + \gamma + \delta = 1$, and M is at least one element selected from the group consisting of Mn, Fe, Ti, Si, Nb, Zr, Mo, and Zn.

The layered structure of the lithium composite oxide includes, for example, a layered structure belonging to a space group R-3m, and a layered structure belonging to a space group C2/m. Among them, the layered structure belonging to the space group R-3m is preferred in terms of increasing capacity, stability of crystal structure, etc.

The proportion of Li in the lithium composite oxide satisfies $0.95 \leq a < 1.05$ and more preferably $0.97 \leq a \leq 1.03$. When a is less than 0.95, the battery capacity may be decreased as compared with the case where a satisfies the above range. When a is 1.05 or more, a larger amount of lithium compound is to be added as compared with the case where a satisfies the above range, which may not be economical from the viewpoint of production cost.

α that indicates the proportion of Ni to the total number of mole of metal elements excluding Li in the lithium composite oxide, satisfies $0.85 \leq \alpha \leq 0.95$ in order to contemplate to increase the capacity of the battery and to add other metal elements.

β that indicates the proportion of Al to the total number of mole of metal elements excluding Li in the lithium composite oxide, satisfies $0 < \beta \leq 0.08$. Since Al does not change in oxidation number even during charge/discharge, the structure of the transition metal layer is presumed to be stabilized because Al is included in the transition metal layer. If the content of Al exceeds 8 mol %, on the other hand, Al impurities are generated, lowering the battery capacity. Al may be uniformly dispersed in the layered structure of the lithium composite oxide, for example, or may be present in a portion of the layered structure.

Co and M (M is at least one element selected from the group consisting of Mn, Fe, Ti, Si, Nb, Zr, Mo and Zn) are optional components. γ and δ that indicate the proportion of Co and M, respectively, to the total number of mole of the metal elements excluding Li in the lithium composite oxide, satisfy $0 \leq \gamma \leq 0.1$ and $0 \leq \delta \leq 0.15$, respectively. Since Co is expensive, it is desired to minimize the Co content from the viewpoint of production cost.

X that indicates the proportion of Sr to the total number of mole of the metal elements excluding Li in the lithium composite oxide, satisfies $0 < x \leq 0.015$. It is presumed that containing Sr changes the surface state of the lithium composite oxide by electronic interaction, which enables to lower the resistance. Sr is present as a compound in the layered structure or on the surface of the lithium composite oxide, and Sr can change the surface state of the lithium composite oxide in either form.

The content of elements constituting the lithium composite oxide can be measured by an inductively coupled plasma emission spectrophotometer (ICP-AES), an electron probe microanalyzer (EPMA), an energy dispersive X-ray analyzer (EDX), etc.

In the lithium composite oxide, metal elements other than Li are present in the Li layer having the layered structure. The proportion of the metal elements other than Li present in the Li layer having the layered structure is in the range of 1 mol % or more and 2.5 mol % or less, preferably in the range of 1 mol % or more and 2 mol % or less, based on the total molar amount of the metal elements excluding Li in the lithium composite oxide, in order to reduce the reaction resistance of the battery. When the proportion of the metal elements other than Li in the Li layer having the layered structure is less than 1 mol %, the stability of the layered structure in the state where Li ions in the Li layer are extracted, and the reaction resistance of the battery increases, as compared with the case where the above range is satisfied. Further, when the proportion of the metal elements other than Li in the Li layer having the layered structure exceeds 2.5 mol %, the diffusibility of Li ions in the Li layer is lowered, and the reaction resistance of the battery increases as the battery capacity is reduced, as compared with the case where the above range is satisfied. The metal elements present in the Li layer having the layered structure are mainly Ni, but other metal element may be included.

The proportion of the metal elements other than Li in the Li layer having the layered structure can be acquired from the Rietveld analysis result of the X-ray diffraction pattern by X-ray diffraction measurement of the lithium composite oxide.

The X-ray diffraction pattern is obtained by a powder X-ray diffraction method under the following conditions with a powder X-ray diffractometer (trade name "RINT-TTR", manufactured by Rigaku Co., Ltd., with radiation source Cu-Kα).

Measuring range: 15 to 120°
Scan speed: 4°/min
Analysis range: 30 to 120°
Background: B-spline
Profile function: Split-type pseudo Voigt function
Binding condition: Li(3a)+Ni(3a)=1
Ni(3a)+Ni(3b)=α (α is each content proportion of Ni)
ICSD No.: 98-009-4814

It is noted that PDXL2 (manufactured by Rigaku Co., Ltd.) that is a Rietveld analysis software, is used for Rietveld analysis of the X-ray diffraction pattern.

The lithium composite oxide preferably has a lattice constant a indicating an a-axis length of the crystal structure obtained from the result of the X-ray diffraction pattern by the aforementioned X-ray diffraction, being in the range of $2.870$ Å$< a < 2.877$ Å, and a lattice constant c indicating a c-axis length being in the range of $14.18$ Å$< c < 14.21$ Å. When the lattice constant a is 2.870 Å or less, the interatomic distance in the crystal structure is narrower, the structure becomes unstable, and the reaction resistance of the battery may be increased, as compared with the case where the above range is satisfied. Moreover, when the lattice constant a is 2.877 Å or more, the interatomic distance in the crystal structure is wider, the structure becomes unstable, and the output characteristics of the battery may be deteriorated, as compared with the case where the above range is satisfied. Further, when the lattice constant c is 14.18 Å or less, the interatomic distance in the crystal structure is narrower, causing the unstable structure, and the reaction resistance of the battery may be higher, as compare with the case where the above range is satisfied. Further, when the lattice constant c is 14.21 Å or more, the interatomic distance in the crystal structure is wider, causing the unstable structure, and the output characteristics of the battery may be deteriorated, as compared with the case where the above range is satisfied.

The lithium composite oxide preferably has a crystallite size s calculated by Scherrer equation from the half width of the diffraction peak on the (104) plane of the X-ray diffraction pattern obtained by the aforementioned X-ray diffraction, being $400$ Å$\leq s \leq 800$ Å. When the crystallite size s of the lithium composite oxide is smaller than 400 Å, the crystallinity may decrease and the reaction resistance of the battery may increase, as compared with the case where the above range is satisfied. Further, when the crystallite size s of the lithium composite oxide exceeds 800 Å, the diffusibility of Li may be worsen and the output characteristics of the battery may be deteriorated, as compared with the case where the above range is satisfied. Scherrer's equation is represented by the following equation.

$$s = K\lambda/B \cos \theta$$

In the above equation, s is a crystallite size, λ is a wavelength of X-ray, B is a half width of a diffraction peak on a (104) plane, θ is a diffraction angle (rad), and K is a Scherrer constant. In the present embodiment, K is 0.9.

The content of the lithium composite oxide in the positive electrode active material is, preferably 90% by mass or more, and more preferably 99% by mass or more relative to the total mass of the positive electrode active material, in terms of, for example, improving the capacity of the battery and effectively inhibiting the deterioration of the charge/discharge cycle characteristics.

Further, the positive electrode active material of the present embodiment may include other lithium composite oxide in addition to the lithium composite oxide of the present embodiment. Other lithium composite oxide includes, for example, a lithium composite oxide having a Ni content of 0 mol % or more and less than 85 mol %.

Next, an example of the method for producing a lithium composite oxide will be described.

The method for producing a lithium composite oxide comprises, for example, a first step of obtaining a composite oxide including Ni, Al and an arbitrary metal element, a second step of mixing the composite oxide obtained in the first step and a lithium compound to obtain a mixture, and a third step of calcinating the mixture. Each parameter of the proportion of the metal elements other than Li in the Li layer having the layered structure of the lithium composite oxide finally obtained, the lattice constant a, the lattice constant c, and the crystallite size s, is adjusted by controlling, for example, the mixing proportion of the raw materials in the second step, the calcination temperature and time in the third step, etc.

In the first step, for example, while stirring a solution of metal salts including Ni, Al and an arbitrary metal element (Co, Mn, Fe or the like), an alkaline solution such as sodium hydroxide is added dropwise, and the pH is adjusted to the alkaline side (for example, 8.5 to 12.5) to precipitate (co-precipitate) a composite hydroxide including Ni, Al and the arbitrary metal element, and then the composite hydroxide is calcinated to obtain a composite oxide including Ni, Al and the arbitrary metal element. The calcination temperature is not particularly limited, but is, for example, in the range of 300° C. to 600° C.

In the second step, the composite oxide obtained in the first step is mixed with a lithium compound and a strontium compound to obtain a mixture. The lithium compound includes, for example, $Li_2CO_3$, LiOH, $Li_2O_2$, $Li_2O$, $LiNO_3$, $LiNO_2$, $Li_2SO_4$, $LiOH \cdot H_2O$, LiH and LiF. The strontium compound includes $Sr(OH)_2$, SrO, $SrCo_3$, $SrSO_4$ and $Sr(NO_3)_2$. The mixing proportion of the composite oxide obtained in the first step and the lithium compound is, preferably, for example, such that the molar ratio of the metal elements excluding Li and Li is in the range of 1:0.98 to 1:1.1, in terms of facilitating the aforementioned each parameter to be adjusted to the aforementioned specified ranges. In the second step, when mixing the composite oxide obtained in the first step, the lithium compound, and the strontium compound, some other metal raw material may be added if necessary. The other metal raw material is an oxide or the like including a metal element other than the metal elements constituting the composite oxide obtained in the first step.

In the third step, the mixture obtained in the second step is calcinated at a predetermined temperature and time to obtain a lithium composite oxide according to the present embodiment. The calcination of the mixture in the third step comprise a multi-step calcination step including, for example, a first calcination step of calcinating in a calcination furnace at a first rate of temperature rise up to a first set temperature of 450° C. or higher and 680° C. or lower under an oxygen stream, and a second calcination step of calcinating the calcinated product obtained in the above first calcination step in a calcination furnace at a second rate of temperature rise up to a second set temperature of higher than 680° C. and 800° C. or lower under an oxygen stream. Here, the first rate of temperature rise is in the range of 1.5° C./min or more and 5.5° C./min or less, and the second rate of temperature rise that is slower than the first rate of temperature rise is 0.1° C./min or more and 3.5° C./min or less. By such multi-step calcination, in the lithium transition metal oxide of the present embodiment finally obtained, parameters such as the proportion of metal elements other than Li present in the Li layer having the layered structure, the lattice constant a, the lattice constant c, and the crystallite size s can be adjusted within the ranges specified above. A plurality of the first rates of temperature rise and the second rates of temperature rise may be set for each temperature region provided that they are within the aforementioned specified ranges, respectively. The holding time of the first set temperature in the first calcination step is preferably 0 hours or longer and 5 hours or shorter, and more preferably 0 hours or longer and 3 hours or shorter in terms of adjusting each of the above parameters of the lithium transition metal oxide to the aforementioned specified ranges. The holding time of the first set temperature is the time for maintaining the first set temperature after reaching the first set temperature. The holding time of the second set temperature in the second calcination step is preferably 1 hour or longer and 10 hours or shorter and more preferably 1 hour or longer and 5 hours or shorter, in terms of adjusting each of the above parameters of the lithium transition metal oxide to the aforementioned specified ranges. The holding time of the second set temperature is the time for maintaining the second set temperature after reaching the second set temperature. When calcinating the mixture, in order to adjust each of the above parameters to the aforementioned specified ranges, for example, calcination can be carried out in an oxygen stream having an oxygen concentration of 60% or more and a flow rate of the oxygen stream being set to in the range of 0.2 mL/min to 4 mL/min per 10 $cm^3$ of the calcination furnace and 0.3 L/min or more per kg of the mixture.

[Negative Electrode]

Negative electrode 12 has a negative electrode current collector 40 and negative electrode active material layers 41 formed on both sides of negative electrode current collector 40. As negative electrode current collector 40, a foil of a metal such as copper or a copper alloy that is stable in the potential range of negative electrode 12, or a film or the like in which the metal is arranged on the surface layer, can be used. Negative electrode active material layer 41 includes a negative electrode active material and a binder. The thickness of negative electrode active material layer 41 is, for example, 10 μm to 150 μm on one side of negative electrode current collector 40. Negative electrode 12 can be fabricated by coating the surface of negative electrode current collector 40 with a negative electrode slurry including the negative electrode active material, the binder, etc., drying the coating film, and then rolling it to form negative electrode active material layers 41 on both sides of negative electrode current collector 40.

The negative electrode active material included in negative electrode active material layer 41 is not particularly limited provided that it can reversibly intercalate and deintercalate lithium ions, and a carbon material such as graphite is generally used. The graphite may be any of natural graphite such as scaly graphite, massive graphite and earthy graphite, and artificial graphite such as massive artificial graphite and graphitized mesophase carbon microbeads. Moreover, as the negative electrode active material, a metal such as Si or Sn that alloys with Li, a metal compound including Si, Sn or the like, a lithium titanium composite oxide, or the like may be used. Further, such a material coated with a carbon film may be used. For example, a Si-containing compound represented by $SiO_y$ ($0.5 \le y \le 1.6$), a Si-containing compound in which Si fine particles are dispersed in a lithium silicate phase represented by $Li_{2z}SiO_{(2+z)}$ ($0 < z < 2$), or the like can be combined with graphite.

As the binder included in negative electrode active material layer 41, a fluororesin such as PTFE or PVdF, a PAN, a polyimide, an acrylic resin, a polyolefin or the like may be used as in the case of positive electrode 11, however, styrene-butadiene rubber (SBR) is preferably used. Moreover, negative electrode active material layer 41 may include CMC or a salt thereof, polyacrylic acid (PAA) or a salt thereof, polyvinyl alcohol (PVA), etc.

[Separator]

Separator 13 that is, for example, a porous sheet having ion permeability and insulating property, is used. Specific examples of the porous sheet include a microporous thin membrane, a woven fabric, and anon-woven fabric. As a material of the separator, a polyolefin such as polyethylene or polypropylene, cellulose, or the like is suitable. Separator 13 may have a single-layer structure or a multilayer structure. Further, a resin layer having high heat resistance, such as an aramid resin, and a filler layer including a filler of an inorganic compound, may be disposed on a surface of separator 13.

[Non-Aqueous Electrolyte]

The non-aqueous electrolyte includes, for example, a non-aqueous solvent and an electrolyte salt dissolved in the non-aqueous solvent. As the non-aqueous solvent, for example, an ester, an ether, a nitrile such as acetonitrile, an amide such as dimethylformamide, or a mixed solvent of two or more of them can be used. The non-aqueous solvent may include a halogen substituent in which at least a portion of hydrogen in the solvent is substituted with a halogen atom such as fluorine. The halogen substituent includes, for example, a fluorinated cyclic carbonate such as fluoroethylene carbonate (FEC), a fluorinated chain carbonate, and a fluorinated chain carboxylic acid ester such as fluorine methyl propionate (FMP).

Examples of the aforementioned esters include cyclic carbonate esters such as ethylene carbonate (EC), propylene carbonate (PC) and butylene carbonate, chain carbonate esters such as dimethyl carbonate (DMC), ethyl methyl carbonate (EMC), diethyl carbonate (DEC), methylpropyl carbonate, ethylpropyl carbonate, and methylisopropylcarbonate, cyclic carboxylic acid esters such as γ-butyrolactone (GBL) and γ-valerolactone (GVL), and chain carboxylic acid esters such as methyl acetate, ethyl acetate, propyl acetate, methyl propionate (MP) and ethyl propionate (EP).

Examples of the aforementioned ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, crown ether, and chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxy toluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether and tetraethylene glycol dimethyl ether.

The electrolyte salt is preferably a lithium salt. Examples of lithium salts include borates such as $LiBF_4$, $LiClO_4$, $LiPF_6$, $LiAsF_6$, $LiSbF_6$, $LiAlCl_4$, LiSCN, $LiCF_3SO_3$, $LiCF_3CO_2$, $Li(P(C_2O_4)F_4)$, $LiPF_{6-m}(C_nF_{2n+1})_m$ ($1 < m < 6$, n is 1 or 2), $LiB_{10}Cl_{10}$, LiCl, LiBr, LiI, lithium chloroborane, lithium lower aliphatic carboxylate, $Li_2B_4O_7$, $Li(B)(C_2O_4)F_2)$, and imide salts such as $LiN(SO_2CF_3)_2$ and $LiN(C_1F_{2p+1}SO_2)(C_qF_{2q+1}SO_2)$ wherein p and q are integers of 0 or more. The lithium salt may be used alone, or a plurality of types may be mixed and used. Among them, $LiPF_6$ is preferably used from the viewpoint of ionic conductivity, electrochemical stability, etc. The concentration of the lithium salt is, for example, 0.8 mol to 1.8 mol per 1 L of the non-aqueous solvent. Moreover, a vinylene carbonate or a propane sultone-based additive may be further added.

EXAMPLES

The present disclosure will be further described below with reference to Examples and Comparative Examples, but the present disclosure is not limited to the following Examples. In order to facilitate the comparison, a comparative example in which the total molar amount of the metal elements excluding Li in the lithium composite oxide does not become 1, is also included.

[Production of Positive Electrode Active Material]

Example 1-1

A composite hydroxide represented by $[Ni_{0.86}Al_{0.03}Co_{0.03}Mn_{0.08}](OH)_2$ obtained by the co-precipitation method was calcinated at 500° C. for 8 hours to obtain a composite oxide ($Ni_{0.86}Al_{0.03}Co_{0.03}Mn_{0.08}O_2$). LiOH, $Sr(OH)_2$, $Ti(OH)_4$ and the above composite oxide were mixed so that the molar ratio of Li and the total amount of Ni, Al, Co, Mn, Ti and Sr was 1.03:1, to obtain a mixture. After the mixture was calcinated from room temperature to 650° C. under an oxygen stream with an oxygen concentration of 95% (flow rate of 2 mL/min per 10 $cm^3$ and 5 L/min per kg of the mixture) at a rate of temperature rise of 2.0° C./min, it was calcinated by raising the temperature from 650° C. to 780° C. at a rate of temperature rise of 0.5° C./min. Impurities were removed from this calcinated product by washing with water to obtain a lithium composite oxide. As a result of measuring the composition of the obtained lithium composite oxide by using an ICP emission spectroscopic analyzer (trade name "iCAP6300", manufactured by Thermo Fisher Scientific Inc.), the composition was found to be $LiNi_{0.85}Al_{0.03}Co_{0.03}Mn_{0.08}Ti_{0.01}Sr_{0.001}O_2$. This was used as the positive electrode active material of Example 1-1.

Comparative Example 1-1

A lithium composite oxide was obtained in the same manner as in Example 1-1 except that LiOH, $Ti(OH)_4$, and a composite oxide ($Ni_{0.86}Al_{0.03}Co_{0.03}Mn_{0.08}O_2$) were mixed so that the molar ratio of Li and the total amount of Ni, Al, Co, Mn, and Ti was 1.03:1, to obtain a mixture. The composition of the obtained lithium composite oxide was $LiNi_{0.85}Al_{0.03}Co_{0.03}Mn_{0.08}Ti_{0.01}O_2$). This was used as the positive electrode active material of Comparative Example 1-1.

Comparative Example 1-2

A lithium composite oxide was obtained in the same manner as in Example 1-1 except that a composite hydroxide represented by $[Ni_{0.85}Co_{0.05}Mn_{0.1}](OH)_2$ was used and the molar ratio of Li and the total amount of Ni, Co, and Mn was 1.1:1, to obtain a mixture. The composition of the obtained lithium composite oxide was $LiNi_{0.85}Co_{0.05}Mn_{0.1}O_2$. This was used as the positive electrode active material of Comparative Example 1-2.

Comparative Example 1-3

A lithium composite oxide was obtained in the same manner as in Example 1-1 except that a composite hydroxide represented by $[Ni_{0.85}Co_{0.05}Mn_{0.1}](OH)_2$ was used and LiOH, $Sr(OH)_2$ and a composite oxide $(Ni_{0.85}Co_{0.05}Mn_{0.1}O_2)$ were mixed so that the molar ratio of Li and the total amount of Ni, Co, Mn, and Sr was 1.08:1, to obtain a mixture. The composition of the obtained lithium composite oxide was $LiNi_{0.85}Co_{0.05}Mn_{0.1}Sr_{0.01}O_2$. This was used as the positive electrode active material of Comparative Example 1-3.

Comparative Example 1-4

A lithium composite oxide was obtained in the same manner as in Example 1-1 except that a composite hydroxide represented by $[Ni_{0.88}Al_{0.09}Co_{0.03}](OH)_2$ was used and LiOH and a composite oxide $(Ni_{0.88}Al_{0.09}Co_{0.03}O_2)$ were mixed so that the molar ratio of Li and the total amount of Ni, Al, and Co was 1.03:1, to obtain a mixture. The composition of the obtained lithium composite oxide was $LiNi_{0.88}Al_{0.09}Co_{0.03}O_2$. This was used as the positive electrode active material of Comparative Example 1-4.

Comparative Example 1-5

A lithium composite oxide was obtained in the same manner as in Example 1-1 except that a composite hydroxide represented by $[Ni_{0.88}Al_{0.09}Co_{0.03}](OH)_2$ was used and LiOH, $Sr(OH)_2$ and a composite oxide $(Ni_{0.88}Al_{0.09}Co_{0.03}O_2)$ were mixed so that the molar ratio of Li and the total amount of Ni, Al, Co, and Sr was 1.03:1, to obtain a mixture. The composition of the obtained lithium composite oxide was $LiNi_{0.88}Al_{0.09}Co_{0.03}Sr_{0.01}O_2$. This was used as the positive electrode active material of Comparative Example 1-5.

Example 2-1

A composite hydroxide represented by $[Ni_{0.94}Al_{0.05}Co_{0.01}](OH)_2$ for use was calcined at 500° C. for 8 hours to obtain a composite oxide $(Ni_{0.94}Al_{0.05}Co_{0.01}O_2)$. LiOH, $Sr(OH)_2$, and the above composite oxide were mixed so that the molar ratio of Li and the total amount of Ni, Al, Co, and Sr was 1.03:1, to obtain a mixture. After the mixture was calcined from room temperature to 650° C. under an oxygen stream with an oxygen concentration of 95% (flow rate of 2 mL/min per 10 cm³ and 5 L/min per kg of the mixture) at a rate of temperature rise of 3.0° C./min, it was calcined by raising the temperature from 650° C. to 700° C. at a rate of temperature rise of 0.5° C./min. Impurities were removed from this calcined product by washing with water to obtain a lithium composite oxide. The composition of the obtained lithium composite oxide was $LiNi_{0.94}Al_{0.05}Co_{0.01}Sr_{0.001}O_2$. This was used as the positive electrode active material of Example 2-1.

Example 2-2

A lithium composite oxide was obtained in the same manner as in Example 2-1 except that a composite hydroxide represented by $[Ni_{0.94}Co_{0.05}Mn_{0.005}](OH)_2$ was used, LiOH, $Nb_2O_5$, $Sr(OH)_2$, and a composite oxide $(Ni_{0.94}Co_{0.05}Mn_{0.005}O_2)$ were mixed so that the molar ratio of Li and the total amount of Ni, Co, Mn, Nb, and Sr was 1.03:1, to obtain a mixture, and the mixture was calcined from room temperature to 650° C. at a rate of temperature rise of 1.5° C./min, and then calcined by raising the temperature from 650° C. to 700° C. at a rate of temperature rise of 1.0° C./min. The composition of the obtained lithium composite oxide was $LiNi_{0.94}Al_{0.05}Mn_{0.005}Nb_{0.005}Sr_{0.01}O_2$. This was used as the positive electrode active material of Example 2-2.

Comparative Example 2-1

A lithium composite oxide was obtained in the same manner as in Example 2-1 except that LiOH and a composite oxide $(Ni_{0.94}Al_{0.05}Co_{0.01}O_2)$ were mixed so that the molar ratio of Li and the total amount of Ni, Al, and Co was 1.03:1, to obtain a mixture. The composition of the obtained lithium composite oxide was $LiNi_{0.94}Al_{0.05}Co_{0.01}O_2$. This was used as the positive electrode active material of Comparative Example 2-1.

Comparative Example 2-2

A lithium composite oxide was obtained in the same manner as in Example 2-1 except that LiOH, $Sr(OH)_2$ and a composite oxide $(Ni_{0.94}Al_{0.05}Co_{0.01}O_2)$ were mixed so that the molar ratio of Li and the total amount of Ni, Al, Co, and Sr was 1.13:1, to obtain a mixture. The composition of the obtained lithium composite oxide was $LiNi_{0.94}Al_{0.05}Co_{0.01}Sr_{0.01}O_2$. This was used as the positive electrode active material of Comparative Example 2-2.

Comparative Example 2-3

A lithium composite oxide was obtained in the same manner as in Example 2-1 except for calcination from room temperature to 650° C. at a rate of temperature rise of 6.0° C./min followed by calcination from 650° C. to 750° C. at a rate of temperature rise of 5.0° C./min. The composition of the obtained lithium composite oxide was $LiNi_{0.94}Al_{0.05}Co_{0.01}Sr_{0.01}O_2$. This was used as the positive electrode active material of Comparative Example 2-3.

Example 3-1

A composite hydroxide represented by $[Ni_{0.91}Al_{0.04}Co_{0.05}](OH)_2$ for use was calcined at 500° C. for 8 hours to obtain a composite oxide $(Ni_{0.91}Al_{0.04}Co_{0.05}O_2)$. LiOH, $Sr(OH)_2$, and the above composite oxide were mixed so that the molar ratio of Li and the total amount of Ni, Al, Co, and Sr was 1.03:1, to obtain a mixture. After the mixture was calcined from room temperature to 650° C. under an oxygen stream with an oxygen concentration of 95% (flow rate of 2 mL/min per 10 cm³ and 5 L/min per kg of the mixture) at a rate of temperature rise of 2.0° C./min, it was calcined by raising the temperature from 650° C. to 720° C. at a rate of temperature rise of 0.5° C./min. Impurities were removed from this calcined product by washing with water to obtain a lithium composite oxide. The composition of the obtained lithium composite oxide was $LiNi_{0.91}Al_{0.04}Co_{0.05}Sr_{0.0005}O_2$. This was used as the positive electrode active material of Example 3-1.

Example 3-2

A lithium composite oxide was obtained in the same manner as in Example 3-1 except that LiOH, $Sr(OH)_2$ and a composite oxide ($Ni_{0.91}Al_{0.04}Co_{0.5}O_2$) were mixed so that the molar ratio of Li and the total amount of Ni, Al, Co, and Sr was 1.01:1, to obtain a mixture. The composition of the obtained lithium composite oxide was $LiNi_{0.91}Al_{0.04}Co_{0.05}Sr_{0.013}O_2$. This was used as the positive electrode active material of Example 3-2.

Example 3-3

A lithium composite oxide was obtained in the same manner as in Example 3-1 except that a composite hydroxide represented by $[Ni_{0.915}Al_{0.04}Co_{0.045}](OH)_2$ was used, and LiOH, $Sr(OH)_2$, SiO and a composite oxide ($Ni_{0.91}Al_{0.04}Co_{0.045}O_2$) was mixed so that the molar ratio of Li and the total amount of Ni, Al, Co, Si, and Sr was 1.03:1, to obtain a mixture. The composition of the obtained lithium composite oxide was $LiNi_{0.91}Al_{0.04}Co_{0.45}Si_{0.05}Sr_{0.001}O_2$. This was used as the positive electrode active material of Example 3-3.

Comparative Example 3-1

A lithium composite oxide was obtained in the same manner as in Example 3-1 except that LiOH and a composite oxide ($Ni_{0.91}Al_{0.04}Co_{0.05}O_2$) were mixed so that the molar ratio of Li and the total amount of Ni, Al, and Co was 1.03:1, to obtain a mixture. The composition of the obtained lithium composite oxide was $LiNi_{0.91}Al_{0.04}Co_{0.05}O_2$. This was used as the positive electrode active material of Comparative Example 3-1.

Comparative Example 3-2

A lithium composite oxide was obtained in the same manner as in Example 3-1 except that LiOH, $Sr(OH)_2$, and a composite oxide ($Ni_{0.91}Al_{0.04}Co_{0.05}O_2$) were mixed so that the molar ratio of Li and the total amount of Ni, Al, Co, and Sr was 1.03:1, and calcination was carried out from room temperature to 650° C. at a rate of temperature rise of 3.0° C./min followed by calcination from 650° C. to 750° C. at a rate of temperature rise of 1.0° C./min. The composition of the obtained lithium composite oxide was $LiNi_{0.91}Al_{0.04}Co_{0.05}Sr_{0.02}O_2$. This was used as the positive electrode active material of Comparative Example 3-2.

Comparative Example 3-3

A lithium composite oxide was obtained in the same manner as in Example 3-1 except that a composite hydroxide represented by $[Ni_{0.92}Al_{0.04}Co_{0.04}](OH)_2$ was used and LiOH, $Mg(OH)_2$ and a composite oxide ($Ni_{0.92}Al_{0.04}Co_{0.04}O_2$) were mixed so that the molar ratio of Li and the total amount of Ni, Al, Co, and Mg was 1.03:1, to obtain a mixture. The composition of the obtained lithium composite oxide was $LiNi_{0.91}Al_{0.04}Co_{0.04}Mg_{0.01}O_2$. This was used as the positive electrode active material of Comparative Example 3-3.

Comparative Example 3-4

A lithium composite oxide was obtained in the same manner as in Example 1-1 except that a composite hydroxide represented by $[Ni_{0.92}Al_{0.04}Co_{0.04}](OH)_2$ was used and LiOH, $Ba(OH)_2$ and a composite oxide ($Ni_{0.92}Al_{0.04}Co_{0.04}O_2$) were mixed so that the molar ratio of Li and the total amount of Ni, Al, Co, and Ba was 1.03:1, to obtain a mixture. The composition of the obtained lithium composite oxide was $LiNi_{0.91}Al_{0.04}Co_{0.04}Ba_{0.01}O_2$. This was used as the positive electrode active material of Comparative Example 3-4.

Example 4-1

A composite hydroxide represented by $[Ni_{0.88}Al_{0.03}Co_{0.08}Fe_{0.01}](OH)_2$ for use was calcinated at 400° C. for 8 hours to obtain a composite oxide ($Ni_{0.88}Al_{0.03}Co_{0.03}Fe_{0.01}O_2$). LiOH, $Sr(OH)_2$, and the above composite oxide were mixed so that the molar ratio of Li and the total amount of Ni, Al, Co, Fe, and Sr was 1.03:1, to obtain a mixture. After the mixture was calcinated from room temperature to 670° C. under an oxygen stream with an oxygen concentration of 95% (flow rate of 2 mL/min per 10 cm³ and 5 L/min per kg of the mixture) at a rate of temperature rise of 2.0° C./min, it was calcinated by raising the temperature from 670° C. to 760° C. at a rate of temperature rise of 0.5° C./min. Impurities were removed from this calcinated product by washing with water to obtain a lithium composite oxide. The composition of the obtained lithium composite oxide was $LiNi_{0.88}Al_{0.03}Co_{0.08}Fe_{0.01}Sr_{0.0008}O_2$. This was used as the positive electrode active material of Example 4-1.

Comparative Example 4-1

A lithium composite oxide was obtained in the same manner as in Example 4-1 except that LiOH and a composite oxide ($Ni_{0.88}Al_{0.03}Co_{0.08}Fe_{0.01}O_2$) were mixed so that the molar ratio of Li and the total amount of Ni, Al, Co, and Fe was 1.03:1, to obtain a mixture. The composition of the obtained lithium composite oxide was $LiNi_{0.88}Al_{0.03}Co_{0.08}Fe_{0.01}O_2$. This was used as the positive electrode active material of Comparative Example 4-1.

The lithium composite oxides (positive electrode active materials) of Examples and Comparative Examples were subjected to powder X-ray diffraction measurement under the aforementioned conditions to obtain X-ray diffraction patterns. Diffraction lines indicating a layered structure were confirmed from all the X-ray diffraction patterns of Examples and Comparative Examples.

From the X-ray diffraction pattern of each Example and each Comparative Example, the proportion of metal elements other than Li, lattice constant a, lattice constant c, and crystallite size s were obtained. The results are summarized in Table 1. The measuring method is as described above.

TABLE 1

| | | Ni-containing lithium transition metal oxide | | | |
|---|---|---|---|---|---|
| | Elements (mol %) | Proportion of metal elements other than Li in Li layer (mol %) | Lattice constant a (Å) | Lattice constant c (Å) | Crystallite size s (Å) |
| Example 1-1 | Ni/Al/Co/Mn/Ti/Sr (85/3/3/8/1/0.1) | 2.1 | 2.876 | 14.20 | 709 |
| Comparative Example 1-1 | Ni/Al/Co/Mn/Ti (85/3/3/8/1) | 1.8 | 2.874 | 14.20 | 748 |

TABLE 1-continued

| | | Ni-containing lithium transition metal oxide | | | |
|---|---|---|---|---|---|
| | Elements (mol %) | Proportion of metal elements other than Li in Li layer (mol %) | Lattice constant a (Å) | Lattice constant c (Å) | Crystallite size s (Å) |
| Comparative Example 1-2 | Ni/Co/Mn (85/5/10) | 2.3 | 2.875 | 14.21 | 981 |
| Comparative Example 1-3 | Ni/Co/Mn/Sr (85/5/10/1) | 2.1 | 2.874 | 14.20 | 903 |
| Comparative Example 1-4 | Ni/Al/Co (88/9/3) | 2.1 | 2.870 | 14.19 | 697 |
| Comparative Example 1-5 | Ni/Al/Co/Sr (88/9/3/1) | 1.9 | 2.871 | 14.19 | 649 |
| Example 2-1 | Ni/Al/Co/Sr (94/5/1/0.1) | 1.2 | 2.874 | 14.20 | 535 |
| Example 2-2 | Ni/Al/Mn/Nb/Sr (94/5/0.5/0.5/1) | 1.6 | 2.877 | 14.21 | 508 |
| Comparative Example 2-1 | Ni/Al/Co (94/5/1) | 1.2 | 2.873 | 14.20 | 562 |
| Comparative Example 2-2 | Ni/Al/Co/Sr (94/5/1/1) | 0.4 | 2.875 | 14.18 | 591 |
| Comparative Example 2-3 | Ni/Al/Co/Sr (94/5/1/1) | 3.0 | 2.878 | 14.22 | 653 |
| Example 3-1 | Ni/Al/Co/Sr (91/4/5/0.05) | 1.3 | 2.872 | 14.19 | 788 |
| Example 3-2 | Ni/Al/Co/Sr (91/4/5/1.3) | 1.6 | 2.870 | 14.20 | 608 |
| Example 3-3 | Ni/Al/Co/Si/Sr (91/4/4.5/0.5/0.1) | 1.2 | 2.871 | 14.19 | 478 |
| Comparative Example 3-1 | Ni/Al/Co (91/4/5) | 1.0 | 2.872 | 14.19 | 802 |
| Comparative Example 3-2 | Ni/Al/Co/Sr (91/4/5/2) | 1.7 | 2.871 | 14.18 | 533 |
| Comparative Example 3-3 | Ni/Al/Co/Mg (91/4/4/1) | 1.2 | 2.870 | 14.18 | 607 |
| Comparative Example 3-4 | Ni/Al/Co/Ba (91/4/4/1) | 1.0 | 2.873 | 14.19 | 654 |
| Example 4-1 | Ni/Al/Co/Fe/Sr (88/3/8/1/0.08) | 1.0 | 2.871 | 14.21 | 613 |
| Comparative Example 4-1 | Ni/Al/Co/Fe (88/3/8/1) | 1.3 | 2.871 | 14.20 | 685 |

Test cells were fabricated as follows, by using the lithium composite oxides (positive electrode active materials) of Examples and Comparative Examples.

[Fabrication of Positive Electrode]

91 parts by mass of the positive electrode active material of Example 1-1, 7 parts by mass of acetylene black as a conductive agent, and 2 parts by mass of polyvinylidene fluoride as a binder were mixed to prepare a positive electrode slurry by mixing with N-methyl-2-pyrrolidone (NMP). Next, the surface of a positive electrode current collector composed of an aluminum foil having a thickness of 15 μm was coated with the slurry, the coating film was dried, and then rolled with a rolling roller to fabricate a positive electrode. Positive electrodes of other Examples and Comparative Examples were fabricated in the same manner.

[Preparation of Non-Aqueous Electrolyte]

Ethylene carbonate (EC), methyl ethyl carbonate (MEC), and dimethyl carbonate (DMC) were mixed in a volume ratio of 3:3:4. A non-aqueous electrolyte was prepared by dissolving lithium hexafluorophosphate ($LiPF_6$) in the mixed solvent at a concentration of 1.2 mol/liter.

[Fabrication of Test Cell]

The positive electrode of Example 1-1 and the negative electrode made of a lithium metal foil were stacked so as to face each other with a separator therebetween, and were wound to fabricate an electrode assembly (about 66 mAh).

Next, the electrode assembly and the non-aqueous electrolyte were inserted into an aluminum outer body to fabricate a test cell. Positive electrodes of other Examples and Comparative Examples were fabricated in the same manner.

[Measurement of Reaction Resistance]

The above test cell was charged with a constant current at 13.2 mA until the cell voltage reached 4.3 V under a temperature condition of 25° C., and then charged at a constant voltage of 4.3 V until the current value reached down to 0.66 mA. Subsequently, constant current discharge was carried out at 13.2 mA until the cell voltage fell down to 2.5 V. Then, under the temperature condition of 25° C. again, constant current charge was carried out at 13.2 mA until the cell voltage reached 4.3 V, and then constant voltage charge was carried out at 4.3 V until the current value reached down to 0.66 mA. Next, AC impedances of the test cell were measured from 20 kHz to 0.01 Hz by using an AC impedance measuring device, a call plot of the cell was drawn from the measurement data, and the reaction resistance was determined from the size of the arc between 10 Hz and 0.1 Hz.

The reaction resistances of Examples and Comparative Examples are shown separately in Tables 2 to 5. The reaction resistance of the test cell of Example 1-1 as shown in Table 2 is the relative value of the reaction resistance of the test cell of Comparative Example 1-1 being 100. Similarly, the reaction resistance of the test cell of Comparative Example 1-3 is the relative value of the reaction resistance of the test cell of Comparative Example 1-2 being 100, and the reaction resistance of the test cell of Comparative Example 1-5 is the relative value of the reaction resistance of the test cell of Comparative Example 1-4 being 100.

The reaction resistances of the test cells of Examples 2-1 and 2-2 and Comparative Examples 2-2 and 2-3 shown in Table 3 are the relative values of the reaction resistance of the test cell of Comparative Example 2-1 being 100.

The reaction resistances of the test cells of Examples 3-1 to 3-3 and Comparative Examples 3-2 to 3-4 shown in Table 4 are the relative values of the reaction resistance of the test cell of Comparative Example 3-1 being 100.

The reaction resistance of the test cell of Example 4-1 shown in Table 5 is the relative value of the reaction resistance of the test cell of Comparative Example 4-1 being 100.

TABLE 2

| | Ni-containing lithium transition metal oxide | | |
| | | Proportion of metal elements other than Li in Li layer | Battery property |
| | Elements (mol %) | (mol %) | Reaction resistance |
|---|---|---|---|
| Example 1-1 | Ni/Al/Co/Mn/Ti/Sr (85/3/3/8/1/0.1) | 2.1 | 71 |
| Comparative Example 1-1 | Ni/Al/Co/Mn/Ti (85/3/3/8/1) | 1.8 | 100 |
| Comparative Example 1-2 | Ni/Co/Mn (85/5/10) | 2.3 | 100 |
| Comparative Example 1-3 | Ni/Co/Mn/Sr (85/5/10/1) | 2.1 | 101 |
| Comparative Example 1-4 | Ni/Al/Co (88/9/3) | 2.1 | 100 |
| Comparative Example 1-5 | Ni/Al/Co/Sr (88/9/3/1) | 1.9 | 101 |

TABLE 3

| | Ni-containing lithium transition metal oxide | | |
| | | Proportion of metal elements other than Li in Li layer | Battery property |
| | Elements (mol %) | (mol %) | Reaction resistance |
|---|---|---|---|
| Example 2-1 | Ni/Al/Co/Sr (94/5/1/0.1) | 1.2 | 55 |
| Example 2-2 | Ni/Al/Mn/Nb/Sr (94/5/0.5/0.5/1) | 1.6 | 61 |
| Comparative Example 2-1 | Ni/Al/Co (94/5/1) | 1.2 | 100 |
| Comparative Example 2-2 | Ni/Al/Co/Sr (94/5/1/1) | 0.4 | 111 |
| Comparative Example 2-3 | Ni/Al/Co/Sr (94/5/1/1) | 3.0 | 112 |

TABLE 4

| | Ni-containing lithium transition metal oxide | | |
| | | Proportion of metal elements other than Li in Li layer | Battery property |
| | Elements (mol %) | (mol %) | Reaction resistance |
|---|---|---|---|
| Example 3-1 | Ni/Al/Co/Sr (91/4/5/0.05) | 1.3 | 36 |
| Example 3-2 | Ni/Al/Co/Sr (91/4/5/1.3) | 1.6 | 68 |
| Example 3-3 | Ni/Al/Co/Si/Sr (91/4/4.5/0.5/0.1) | 1.2 | 44 |
| Comparative Example 3-1 | Ni/Al/Co (91/4/5) | 1.0 | 100 |
| Comparative Example 3-2 | Ni/Al/Co/Sr (91/4/5/2) | 1.7 | 110 |
| Comparative Example 3-3 | Ni/Al/Co/Mg (91/4/4/1) | 1.2 | 100 |
| Comparative Example 3-4 | Ni/Al/Co/Ba (91/4/4/1) | 1.0 | 102 |

TABLE 5

| | | Reaction resistance | | Reaction resistance |
| Reaction resistance | Reaction resistance | | Reaction resistance | Reaction resistance |
|---|---|---|---|---|
| Example 4-1 | Ni/Al/Co/Fe/Sr (88/3/8/1/0.08) | | 1.0 | 52 |
| Comparative Example 4-1 | Ni/Al/Co/Fe (88/3/8/1) | | 1.3 | 100 |

In Table 2, Example 1-1 including 0.1 mol % of Sr exhibited a lower reaction resistance than Comparative Example 1-1 not containing Sr, indicating the effect of containing Sr. Further, as Comparative Examples 1-2 to 1-5 each includes an Al content of 0 mol % or 9 mol %, which was not in the range of $0<\beta\leq0.08$, therefore the reaction resistance did not change depending on the presence or absence of Sr. Further, it is presumed that from Example 1-1, the lithium composite oxide (positive electrode active material) may contain Mn and Ti.

It was found from Table 3 that Example 2-1 in which the proportion of metal elements other than Li in the Li layer was 1.2, exhibited the lower reaction resistance than Comparative Example 2-1 due to the effect of containing Sr. However, Comparative Examples 2-2 and 2-3 in which the proportions of metal elements other than Li in the Li layer were 0.4 and 3.0, respectively, each exhibited the higher reaction resistance than Comparative Example 2-1 although they contained Sr. Further, from Example 2-2, it is presumed that the lithium composite oxide (positive electrode active material) may contain Mn and Nb.

In Table 4, the reaction resistances of Examples 3-1 to 3-3 each was lower than that of Comparative Example 3-1 due to the effect of containing Sr. On the other hand, Comparative Example 3-2 containing as much Sr as 2 mol %, thus exhibited the higher reaction resistance than Comparative Example 3-1. Further, Comparative Examples 3-3 and 3-4, containing Mg and Ba instead of Sr, respectively, exhibited the reaction resistance that was substantially the same as that of Comparative Example 3-1. Further, from Example 3-3, it is presumed that the lithium composite oxide (positive electrode active material) may contain Si.

In Table 5 as well, the reaction resistance of Example 4-1 including 0.08 mol % of Sr was lower than that of Comparative Example 4-1 without Sr, indicating the effect of containing Sr. Further, from Example 4-1 it is presumed that the lithium composite oxide (positive electrode active material) may contain Fe.

REFERENCE SIGNS LIST

10 non-aqueous electrolyte secondary battery
11 positive electrode
12 negative electrode
13 separator
14 electrode assembly
15 battery case
16 outer can
17 sealing assembly
18, 19 insulating plates
20 positive electrode tab
21 negative electrode tab
22 groove portion
23 bottom plate
24 lower vent member
25 insulating member
26 upper vent member
27 cap
28 gasket
30 positive electrode current collector
31 positive electrode active material layer
40 negative electrode current collector
41 negative electrode active material layer

The invention claimed is:

1. A positive electrode active material for non-aqueous electrolyte secondary batteries, including a lithium composite oxide having a layered structure and represented by a formula $Li_aNi_\alpha Al_\beta Co_\gamma M_\delta Sr_x O_{2-w}$ wherein $0.95<a<1.05$, $0.85\leq\alpha\leq0.95$, $0<\beta\leq0.08$, $0\leq\gamma\leq0.1$, $0\leq\delta\leq0.15$, $0<x\leq0.015$, $0\leq w<0.05$, $\alpha+\beta+\gamma+\delta=1$, and M is at least one element selected from the group consisting of Mn, Fe, Ti, Si, Nb, Zr, Mo, and Zn, wherein the layered structure includes a Li layer including metal elements other than Li, and a proportion of the metal elements other than Li present in the Li layer is in a range of 1 mol % or more and 2.5 mol % or less based on a total molar amount of the metal elements excluding Li in the lithium composite oxide.

2. The positive electrode active material for non-aqueous electrolyte secondary batteries according to claim 1, wherein the lithium composite oxide has a lattice constant a indicating an a-axis length and a lattice constant c indicating a c-axis length, in a crystal structure obtained from analysis results of an X-ray diffraction pattern by X-ray diffraction, are in ranges of 2.870 Å<a<2.877 Å and 14.18 Å<c<14.21 Å.

3. The positive electrode active material for non-aqueous electrolyte secondary batteries according to claim 1, wherein the lithium composite oxide has a crystallite size s, which is calculated by Scherrer's equation from a half width of a diffraction peak on a (104) plane of an X-ray diffraction pattern by X-ray diffraction, is in a range of 400 Å≤s≤800 Å.

4. A non-aqueous electrolyte secondary battery comprising a positive electrode including the positive electrode active material for non-aqueous electrolyte secondary batteries according to claim 1, a negative electrode, and a non-aqueous electrolyte.

5. The positive electrode active material for non-aqueous electrolyte secondary batteries according to claim 1, wherein the metal elements other than Li present in the Li layer include Ni.

6. A positive electrode active material for non-aqueous electrolyte secondary batteries, including a lithium composite oxide having a layered structure and represented by a formula $Li_aNi_\alpha Al_\beta Co_\gamma M_\delta Sr_x O_{2-w}$ wherein $0.95<a<1.05$, $0.85\leq\alpha\leq0.95$, $0<\beta\leq0.08$, $0\leq\gamma\leq0.1$, $0\leq\delta\leq0.15$, $0<x\leq0.015$, $0\leq w<0.05$, $\alpha+\beta+\gamma+\delta=1$, and M is at least one element selected from the group consisting of Mn, Fe, Ti, Si, Nb, Zr, Mo, and Zn, wherein the layered structure includes a Li layer including metal elements other than Li, and a proportion of the metal elements other than Li present in the Li layer is in a range of 1 mol % or more and 2.5 mol % or less based on a total molar amount of the metal elements excluding Li in the lithium composite oxide, wherein the layered structure belongs to a space group R-3m.

\* \* \* \* \*